United States Patent
Jarmusch

[11] Patent Number: 5,825,836
[45] Date of Patent: Oct. 20, 1998

[54] TETRAHEDRAL COLLIDING BEAM NUCLEAR FUSION

[76] Inventor: D. Lloyd Jarmusch, P.O. Box 677, Kilauea, Hi. 96754

[21] Appl. No.: 802,666

[22] Filed: Feb. 19, 1997

[51] Int. Cl.$^6$ ..................................................... G21B 1/02
[52] U.S. Cl. ............................................................. 376/107
[58] Field of Search ................................... 376/103–107, 376/146

[56] References Cited

U.S. PATENT DOCUMENTS

| | | | |
|---|---|---|---|
| 4,172,008 | 10/1979 | Fleet | 376/107 |
| 4,189,346 | 2/1980 | Jarnagin | 376/107 |
| 4,202,725 | 5/1980 | Jarnagin | 376/107 |
| 4,390,494 | 6/1983 | Salisbury | 376/107 |
| 4,397,810 | 8/1983 | Salisbury | 376/107 |
| 4,650,630 | 3/1987 | Boyer | 376/107 |

OTHER PUBLICATIONS

Sourcebook on Atomic 1967 Glasstone, Samuel pp. 290–295, 348–349, 353–354, 359, 368–369, 540–541 Energy U.S. Atomic Energy Commission.
Nuclear Fusion 1989 Niu, Keishiro Cambridge University Press pp. 17, 148, 85 .
Modern Physics 1978 Tipler, Panl p. 411.
Encyclopedia Britannicu 1974 pp. 307–313 vol. 13.

*Primary Examiner*—Daniel D. Wasil

[57] ABSTRACT

The subject invention is a nuclear fusion reactor. It operates by colliding particle beams from at least four different directions. The beams collide in a matrix that guides the particles to the reaction's center by their mutual electrostatic repulsion. In the preferred embodiment the reactor comprises primarily four high energy particle accelerators (11a, 11b, 11c, and 11d). At the reactor's center, the accelerators' four beams intersect at angles of approximately 109.471220634491 degrees. The exact measure of the preferred angle is given by the measure of the obtuse interior angle of an isosceles triangle that has two sides measuring the square root of three units and a base measuring twice the square root of two units. Accelerated to fusion producing velocities, the four particle beams intersect in a high-vacuum reaction chamber (12). The resulting collision matrix funnels the accelerated particles into the center of the reaction zone causing some of the fuel particles to fuse rather than to scatter. This reactor's collision matrix should result in a higher collision rate than that of previous non-neutralized beam-beam reactors. When the reactor is inducing fusion with lightweight elements such as deuterium, energy is released, although not necessarily more energy than it consumes. This reactor is inherently safe in that it cannot melt down or explode. Since the fuel for fusion is cheap and in virtually unlimited supply this reactor or some future improvement of its design could possibly yield virtually unlimited power.

16 Claims, 4 Drawing Sheets

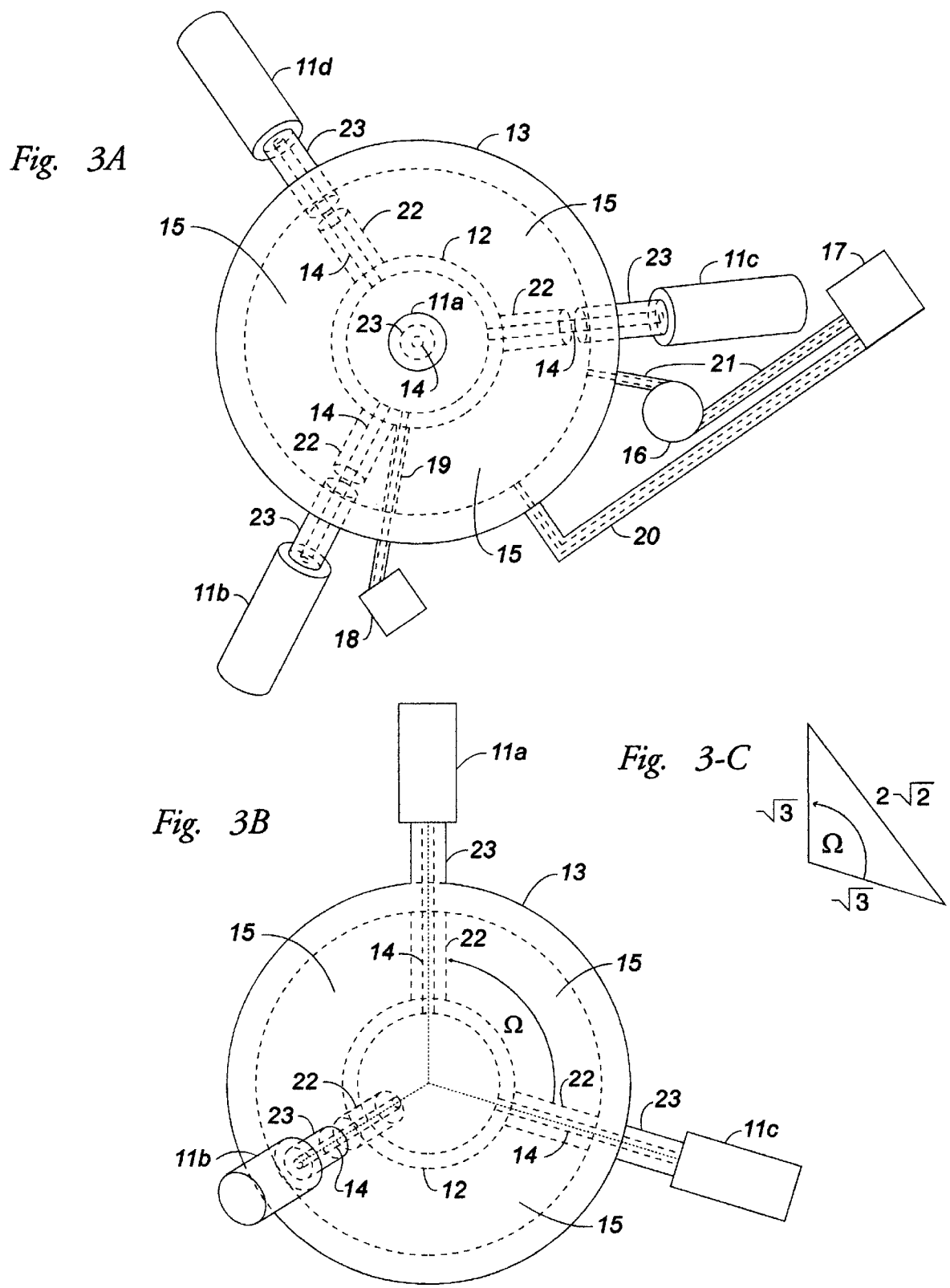

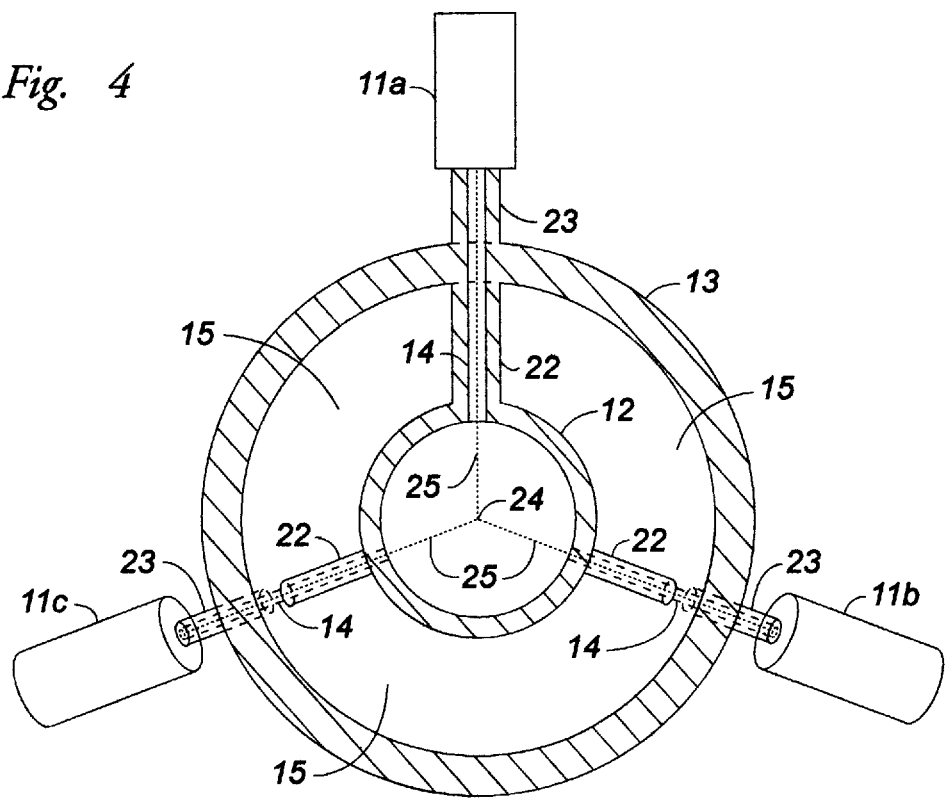
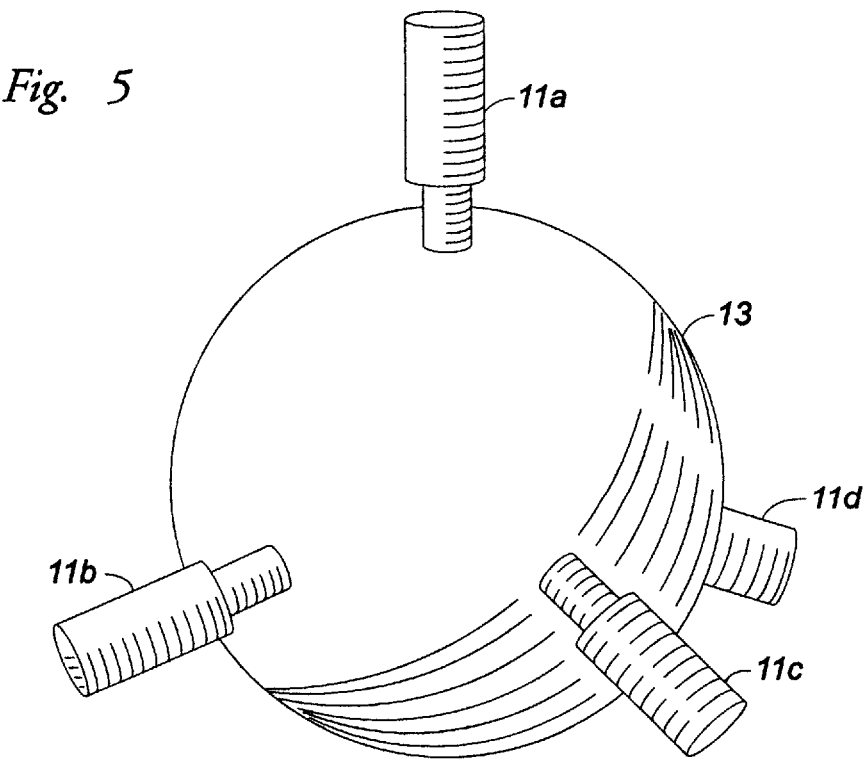

TETRAHEDRAL COLLIDING BEAM NUCLEAR FUSION

BACKGROUND

This invention relates to nuclear fusion, specifically, this invention relates to nuclear fusion induced by colliding particle beams from four different directions in a funnel-like matrix.

PRIOR ART

Induced Nuclear Fusion Reactions

Nuclear fusion, in which atomic nuclei unite to form a nucleus of a heavier mass number, can be induced by various processes and devices. These generally use light element fuel materials that combine in exothermic (energy releasing) fusion reactions. In the prior art there is no method, process or device that can induce a controlled nuclear fusion reaction that produces more usable power than it consumes.

All fusion reactors of the prior art have been inefficient. None have reached either engineering break-even or commercial break-even. Engineering break-even is the point at which the reactor generates enough power to keep itself going. Commercial break-even is the point where the reactor generates surplus power that can be sold at competitive rates at enough profit to justify the construction expenses. If we could economically induce efficient controlled fusion reactions, then fusion power plants would be an ideal source of energy because: 1) they are not inherently at risk of accidentally releasing large amounts of radioactive material into the environment; 2) the radioactive waste from fusion, if any, is much less in volume and is much shorter lived than that of fission power plants; and, 3) nuclear fuel for fusion is cheap and exists in almost unlimited quantities.

Scientists have used various methods in attempts to induce efficient controlled fusion reactions including thermonuclear fusion and particle beam impact fusion. These two ways of inducing fusion are briefly discussed below.

Thermonuclear Fusion

Thermonuclear reactors approximate the conditions in the interior of stars where fusion reactions occur naturally due to the extremely high temperatures and pressures prevailing there. In thermonuclear reactors, heating of the fusion material to temperatures on the order of $10^8$ degrees Kelvin results in high thermonuclear reaction rates. Thermonuclear fusion reactions occur primarily as the result of random collisions within the apparatus between plasma particles. A plasma is an ionized gaseous substance consisting of positive ions and free electrons. Although thermonuclear methods so far have been successful in inducing fusion, they have not been efficient sources of energy. Among the problems of the thermonuclear method are the following:

1) Ignition criteria—that is, the need to simultaneously achieve sufficient density, containment time and temperature for the plasma to ignite and stay ignited without exploding.
2) The need to contain the fusion material once it has been heated to a superhot plasma. Superhot plasmas vaporize the walls of containers on contact. Thus special confinement methods, such as magnetic confinement, are needed.
3) The difficulty of adding fuel across a magnetic barrier or other barrier to the contained plasma.
4) The tendency of fusion reactions to create by-products that contaminate and halt the reaction.

Particle Beam Induced Fusion (Impact Fusion)

Up to the present time, particle beam (impact) fusion had been less promising than thermonuclear fusion. Yet there are several problems of thermonuclear fusion that particle beam fusion overcomes. Among these are:

1) There is no need for particle beam methods to satisfy "ignition" criteria since particle beams constantly reignite the reaction.
2) There is no need for an elaborate containment vessel since there is no need for a superhot plasma, per se. Temperature is a measure of average collision energy of particles in a substance. Thus, particle beams can, in effect, achieve the equivalent of high temperatures by achieving high collision energy. For instance, the average collision velocity of particles in a plasma at $10^8$ degrees Kelvin is approximately 10 keV. Therefore, two beams intersecting at relative energies of approach of 10 keV approximate the temperature conditions of thermonuclear fusion. Since there is no superhot plasma per se, and fusion events occur only in the collision reaction zone, as with inertial confinement, the reaction is operationally confined.
3) There is no problem of adding fuel to the reaction in particle beam fusion since the particles of the beams constitute the fuel.
4) The problem of fusion by-products halting the reaction can be overcome by pulsing the beams and having the by-products removed by evacuation of the reaction chamber.

There are two primary impact fusion methods—"stationary target" and "nonstationary target." Stationary target impact fusion involves bombarding a stationary target of fusible material with fast particles; for example, bombarding a pellet or plasma of deuterium with a stream of deuterons. Nonstationary target impact fusion involves bombarding nonstationary targets of fusible material with fast particles; for example, colliding one beam of fast particles with a second beam of fast particles. Both stationary and nonstationary targets have been used to induce fusion, but both present unique challenges that have prevented them from becoming significant sources of fusion energy.

Stationary Target, Single or Multiple Particle Beam

The primary difficulty that prevents a significant yield of fusion events when stationary targets of fusible materials are bombarded with high energy particles is that the high energy particles lose considerable energy on impact with the target material. The projectile particles are usually slowed to the point where they no longer have sufficient energy of approach to overcome electrostatic repulsion. In attempts to surmount this difficulty, scientists have accelerated projectile particles to strike stationary targets at very high energies. At these higher energies of approach many projectile particles undergo fusion but the energy yield from fusion events is not enough to make up for the energy expended on accelerating the particles to such high velocities. The following three reasons for the loss of energy in the projectile particles constitute the three major impediments to the success of stationary target fusion as an energy source:

1) incoming projectile particles collide with orbital electrons in the target material;
2) the incoming particles and nuclei within the target material repulse each other because of their Coulomb (electrostatic) fields; and
3) the center of mass of the reaction shifts after initial impact.

Multiple Colliding Particle Beams (Nonstationary Target)

Multiple colliding particle beam, or nonstationary target, impact fusion methods generally overcome two of the problems of stationary target impact fusion. One of the problems overcome is that of collisions with orbital electrons. In nonstationary target impact fusion where two or more high energy particle beams are colliding with each other, the beams are usually made up of positive ionized particles stripped of their electrons. Therefore, there are no electrons to interfere with the reaction. The other problem overcome is that of the shift in the center-of-mass. When particle beams are colliding head-on to produce fusion, there is generally no appreciable shift in the center-of-mass of the reaction.

The primary difficulty that prevents significant numbers of fusion events between the nuclei that make up multiple colliding particle beams is that the bombarding particles tend to scatter each other due to Coulomb repulsion. Two particles in isolation are likely to collide only if they are approaching each other from nearly opposite directions. As they approach each other, their Coulomb repulsion becomes stronger. Thus, slight deviations from a perfect collision course tend to be rapidly exaggerated. The rate at which deviations are exaggerated increases as the particles approach each other. All prior experiments with multiple beams colliding head-on have failed to achieve significant rates of fusion due to the scattering of the interacting particles. Consequently, all impact fusion methods of the prior art have been unable to produce more usable power than they consume.

OBJECTS AND ADVANTAGES

Accordingly, it is an object of this invention to provide a nuclear fusion reactor that has, among others, the following advantages over the prior art:

1) the power output to power input ratio is increased over previous non-neutralized beam-beam reactors;
2) scattering of colliding particle beams by electrostatic repulsion is reduced from the amount of scattering of previous non-neutralized beam-beam reactors;
3) there is no collision with orbital electrons;
4) this reactor causes no shift in the center of mass of the reaction;
5) there is no containment problem;
6) there is no problem of adding fuel to the reaction;
7) there is no need to reach self ignition criteria per se;
8) contaminant by-products are easily removed from the reaction;
9) it is a relatively simple and inexpensive reactor;
10) the radioactive waste, if any, is minimal and is much shorter lived than that of fission power plants;
11) there is no risk of this reactor exploding or accidentally releasing large amounts of radioactive material into the environment; and
12) this reactor's fuel is cheap and exists in virtually unlimited quantities.

Other objects and advantages of this reactor will become clear in the following specifications and illustrations.

BRIEF DESCRIPTION OF THE DRAWING FIGURES OF THE PREFERRED EMBODIMENT

FIG. 1-A is a top view of the reactor showing the line of cross section for FIG. 4.

FIG. 1-B is a side view of the reactor as positioned in FIG. 1-A.

FIG. 2-A is a top view of the reactor (FIG. 1-A rotated 60 degrees counter clockwise).

FIG. 2-B is a side view of the reactor as positioned in FIG. 2-A.

FIG. 3-A is a top view of the reactor (FIG. 1-A rotated 30 degrees counter clockwise).

FIG. 3-B is a side view of the reactor as positioned in FIG. 3-A.

FIG. 3-C is a diagram showing $\Omega$, the preferred angle of incidence.

FIG. 4 is a side view of the cross section indicated in FIG. 1-A.

FIG. 5 is an oblique perspective view of the reactor's exterior from slightly above and to the left.

LIST OF REFERENCE NUMERALS REGARDING THE PREFERRED EMBODIMENT

11$a$ Accelerator, with Ion Source and Focusing Apparatus
11$b$ Accelerator, with Ion Source and Focusing Apparatus
11$c$ Accelerator, with Ion Source and Focusing Apparatus
11$d$ Accelerator, with Ion Source and Focusing Apparatus
12 High-Vacuum Reaction Chamber
13 Radiation Shield/Pressure Vessel
14 Particle Input Tube
15 Coolant
16 Coolant Pump
17 Heat Exchanger
18 High-Vacuum Pump
19 Evacuation Tube
20 Coolant Intake
21 Coolant Outlet
22 Reaction Chamber Support Column
23 Insulating Column
24 Collision Reaction Zone
25 Path of Particle Beams

SUMMARY

I have conceived a method whereby controlled nuclear fusion reactions may be induced utilizing non-neutralized particle beams. This method is an improvement over previous non-neutralized multiple beam impact fusion methods. With this specification I declare that I am the original and sole inventor of the improved method of inducing nuclear fusion disclosed below. I further maintain that this method of inducing nuclear fusion, and the preferred embodiment described here, are new and not obviously implied in the previous art. The subject invention is a nuclear fusion reactor that causes fusion by colliding particle beams from at least four different directions. Its particle beams intersect at one collision reaction zone. The angles at which the particle beams intersect form funnel-like Coulomb field matrices in front of each particle beam entering the collision reaction zone. Due to the configuration of the whole collision matrix, many of the particles do not tend to scatter but instead collide at fusion producing velocities. This reactor, in its presently preferred embodiment, with four beams all intersecting each other at approximately 109.471220634491 degrees, is more efficient than previous non-neutralized beam-beam impact fusion methods. Consequently, it will be a valuable scientific research tool. Additionally, if the fused particles are of relatively light elements, the reaction releases nuclear energy. Therefore, this method, or some future improvement of its design, may someday result in economically viable nuclear fusion power plants.

Figure 1A:
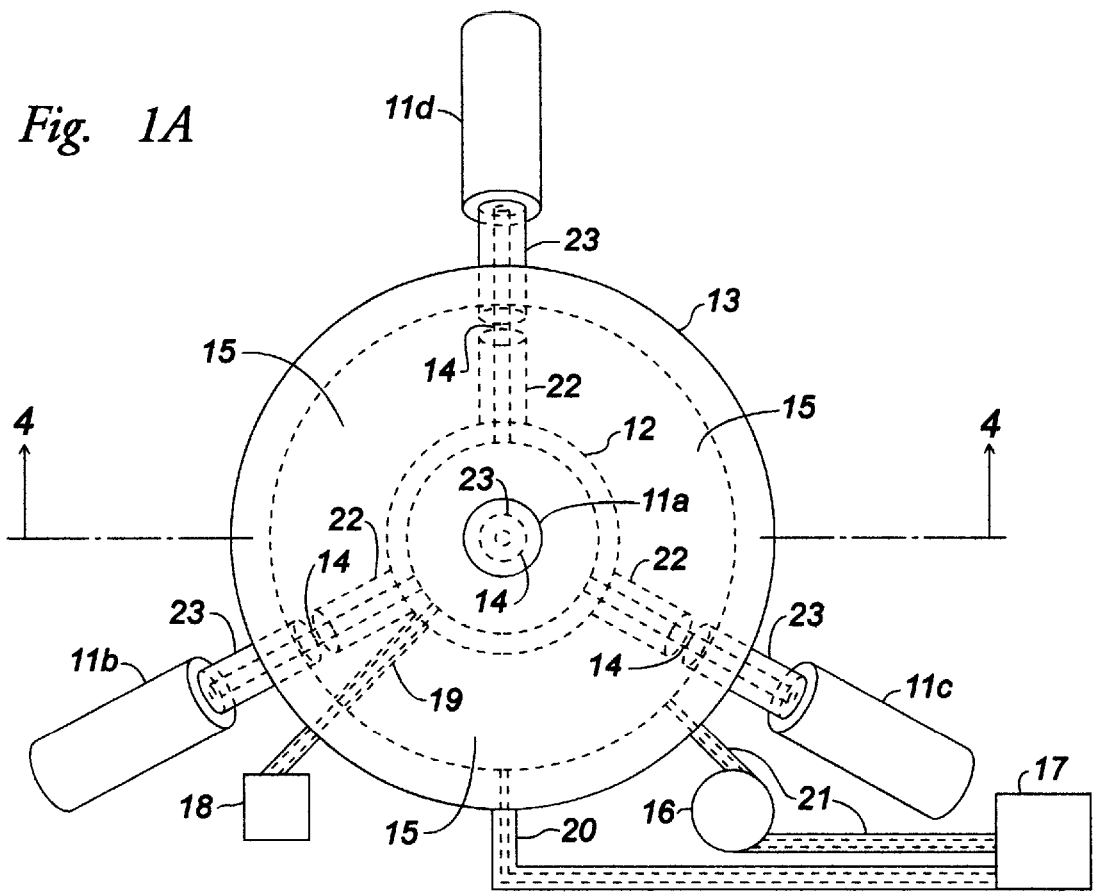
Figure 1B:
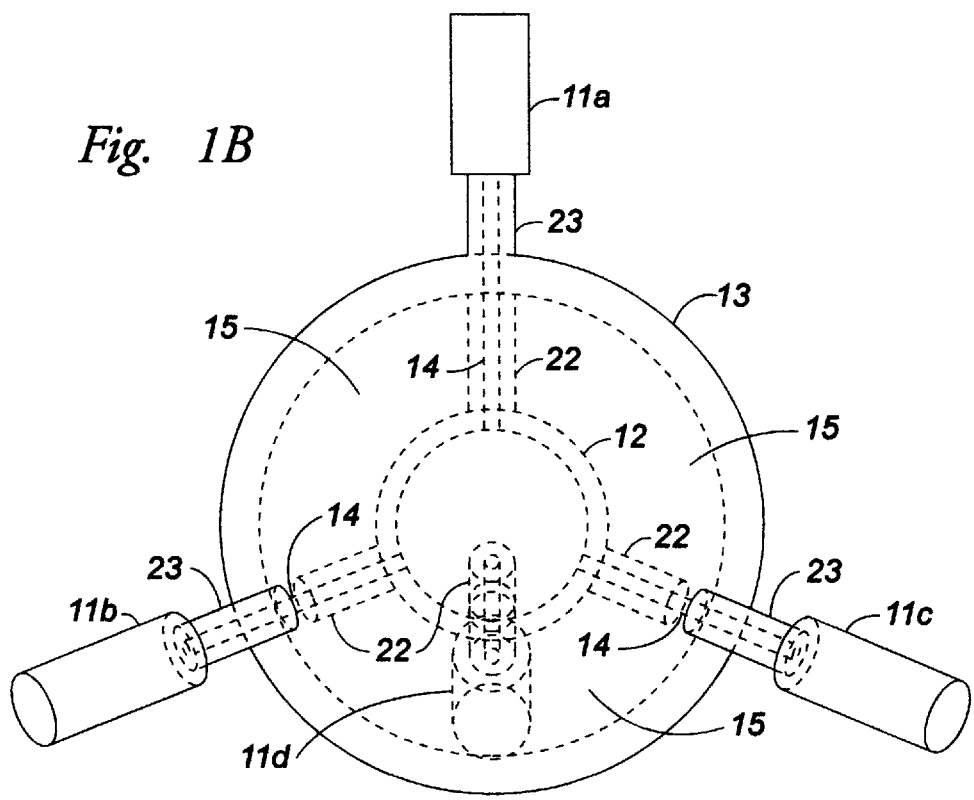

Description of the Physical Form of the Reactor's Presently Preferred Embodiment FIG. 1-A shows a top view of the preferred embodiment of the subject reactor. This figure also shows the line of cross section for FIG. 4. This reactor consists of four identical particle accelerators (11a, 11b, 11c and 11d). Each accelerator (11a–d) includes an ion source and focusing apparatus. The accelerators (11a–d) are located in the four corners of a tetrahedral space. Each accelerator is aimed so that its particle beam intersects the particle beams of the other three accelerators at the center of the tetrahedral space. To picture this arrangement within the framework of a Cartesian three-dimensional coordinate system, imagine four accelerators 11A, 11B, 11C, and 11D such that all four accelerators are aimed to intersect at the origin, O, coordinates (0,0,0). Accelerator 11A is located at point P1 whose coordinates are (1,1,1). Accelerator 11B is located at point P2 whose coordinates are (1,-1,-1). Accelerator 11C is located at point P3 whose coordinates are (-1,1,-1). Accelerator 11D is located at point P4 whose coordinates are (-1,-1,1). The four particle beams intersect each other at approximately 109.471220634491 degrees. The particle beams intersect in the center of the reactor in a high-vacuum reaction chamber (12). The reaction chamber (12) is in heat exchange contact with a coolant (15). The coolant (15) is contained within a pressure vessel (13) that holds the coolant (15) in heat exchange contact with the reaction chamber (12). The pressure vessel (13) will also function as a radiation shield (13), of concrete, lead or other heavy material built around the reaction chamber (12) to block dangerous radiation. A high-vacuum pump (18) maintains vacuum in the reaction chamber (12). The pump (18) evacuates the chamber (12) through an evacuation tube (19) running from the interior of the chamber (12) to the exterior of the reactor. A coolant pump (16) circulates coolant (15) from inside the pressure vessel (13) to a heat exchanger (17) through a coolant outlet (21) and back again into the pressure vessel (13) through a coolant intake (20). The reaction chamber (12) is supported within the pressure vessel (13) by the reaction chamber support columns (22). The accelerators (11a–d) are attached to the outer wall of the pressure vessel (13) by the insulating columns (23). The particle beams enter the reaction chamber (12) through the particle input tubes (14), which are tubular passageways that pass through the center of the insulating columns (23) and the reaction chamber support columns (22).

FIG. 1-B shows a side view of the reactor. The portions of the reactor shown at the bottom of FIG. 1-A are now seen, in the perspective of FIG. 1-B, as closest to the observer. In FIG. 1-B several features of this embodiment of the reactor are not shown because they are conventional; their precise locations are not particularly important; they are not essential to understanding the principle of the reactor; and they are sufficiently indicated in FIG. 1-A. The features omitted from FIG. 1-B include the heat exchanger, coolant pump, high-vacuum pump, evacuation tube, coolant intake, and coolant outlet.

Figure 2A:
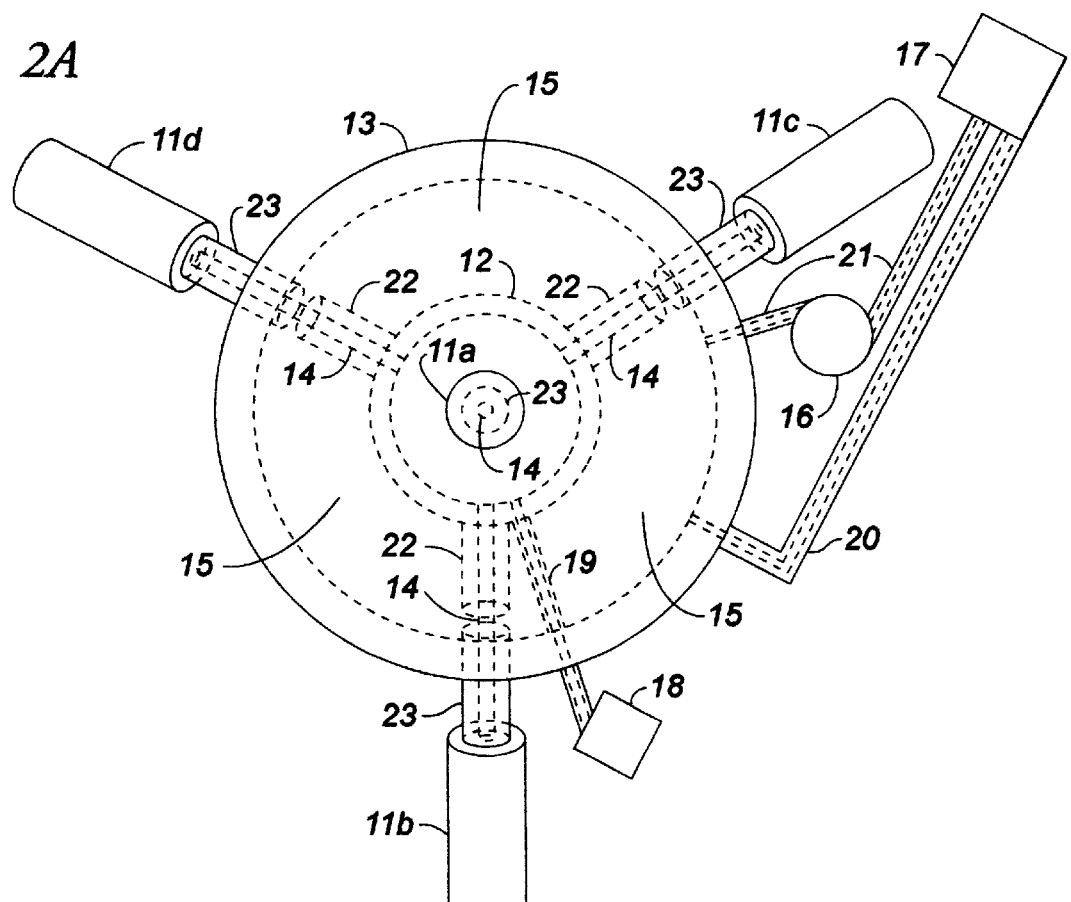
Figure 2B:
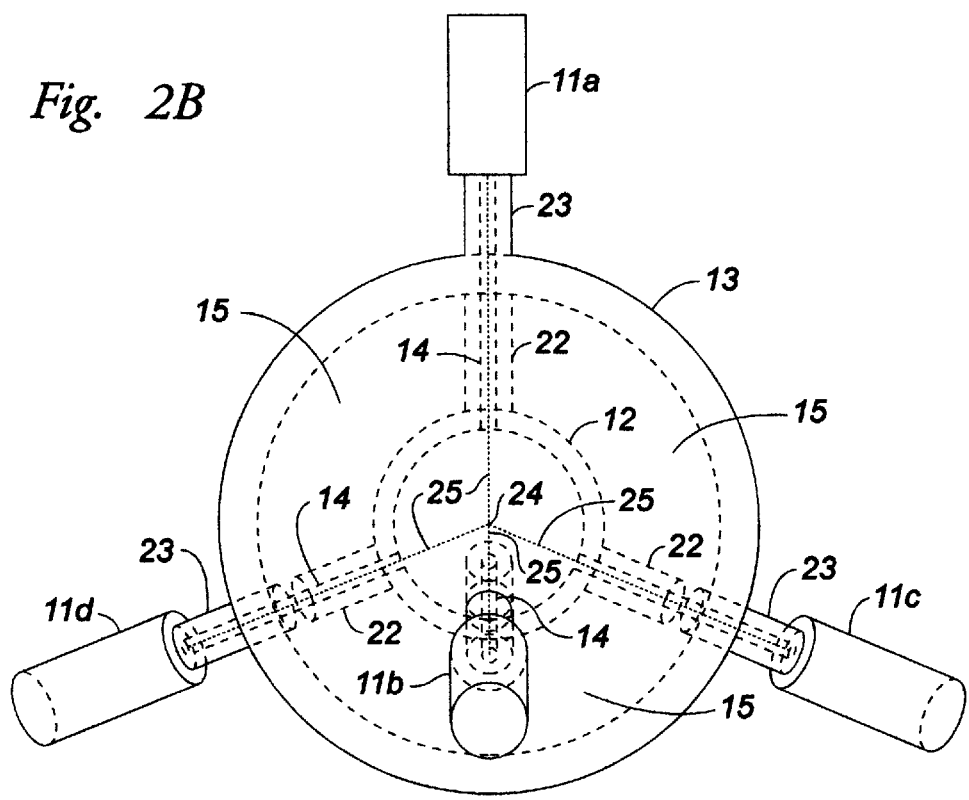

FIG. 2-A is a top view of the reactor (FIG. 1-A rotated 60 degrees counter clockwise).

FIG. 2-B is a side view of the reactor as positioned in FIG. 2-A. The portions of the reactor shown at the bottom of FIG. 2-A are now seen, in the perspective of FIG. 2-B, as closest to the observer. FIG. 2-B points out the collision reaction zone (24) and the path of the colliding particle beams (25). The features omitted in FIG. 1-B are omitted again in this figure for the same reasons.

FIG. 3-A is a top view of the reactor (FIG. 1-A rotated 30 degrees counter clockwise).

FIG. 3-B is a side view of the reactor as positioned in FIG. 3-A. The portions of the reactor shown at the bottom of FIG. 3-A are now seen, in the perspective of FIG. 3-B, as closest to the observer. One accelerator (11c) is not seen in this perspective since it is directly behind an identical accelerator (11d). This is the only perspective from which the angle of incidence between the beams of two accelerators (11a and 11b) appears on paper at the actual angle of measure, Ω, approximately 109.471220634491 degrees. The features omitted in FIG. 1-B are omitted again in this figure for the same reasons.

FIG. 3-C is a representation of Ω. the exact angle at which the four particle beams should intersect. Specifically, Ω is equal to the obtuse interior angle of an isosceles triangle that has two sides of length equal to the square root of three units, and a base of length equal to twice the square root of two units.

FIG. 4 is a side view of the reactor cross section indicated in FIG. 1-A. This figure points out the collision reaction zone (24) and the path of the colliding particle beams (25). Accelerator D (11d) is not seen in this perspective since it is in the cut-away portion of the drawing. The features omitted in FIG. 1-B are omitted again in this figure for the same reasons.

FIG. 5 is an oblique perspective view of the reactors exterior from slightly above and to the left. This figure shows only features of the reactor that would be seen on its exterior. The features omitted in FIG. 1-B are omitted again in this figure for the same reasons.

Operation of Preferred Embodiment

In its presently preferred embodiment, this reactor causes fusion by colliding four beams of high energy particles in a high-vacuum reaction chamber. A high-vacuum pump maintains vacuum in the reaction chamber. Four identical high energy particle accelerators are located in the four corners of a tetrahedral space. For the purposes of this disclosure, the word "accelerator" is intended to indicate a complete accelerator assembly, including an ion source and focusing apparatus. The accelerators are aimed so that their particle beams all intersect at one place, the collision reaction zone. The collision reaction zone is the zone where particle collisions take place. It includes all the points that are in the path of all four beams of the reactor. The four accelerators must be capable of accelerating particles to fusion producing velocities (approximately 10 keV and higher). The accelerators are linked and synchronized so that their particle beams are of the same energy and intensity. Consequently, the center-of-mass of the reaction does not shift. Therefore more of the kinetic energy can go into the reaction, making it more efficient. The accelerators are controlled and monitored by conventional computer systems. The computer control and monitoring devices are not shown in the diagrams because they are conventional, their location is variable, and their location is not particularly relevant to the operation of the reactor.

The particle beams intersect in the center of the tetrahedral space in high-vacuum at the angle Ω. This angle is important since the reactor is most efficient when all four beams intersect each other at the same angle of incidence. There is only one angle at which each one of the four beams could equally intersect all three other beams. That angle Ω, is approximately 109.471220634491 degrees. The arrangement of the accelerators at this angle of incidence results in intersecting beams of high energy particles that do not tend to scatter each other. On the contrary, the intersecting beams form a matrix that tends to funnel particles into the center of the reaction. The collision matrix causes the Coulomb repulsion of the colliding particles to slow the particles down while guiding them into the center of the collision reaction zone. This collision matrix induces some of the high-energy nuclei to approach each other to within approximately $10^{-15}$ meters, close enough so that their mutual Coulomb (electrostatic) repulsion is overcome by the strong nuclear force of attraction (strong hadronic interaction). Therefore, moreso than previous non-neutrailized beam-beam reactors, the nuclei tend to unite; that is, they fuse.

When the particles are of relatively low atomic mass, the resulting reaction is exothermic. Therefore, in order for the reactor to be a useful component of a commercial power plant, the reactor's accelerators must be capable of accelerating light element nuclear fusion fuel material of some sort such as hydrogen, deuterium, tritium, helium, lithium, boron, beryllium, etc. Also, they must be capable of accelerating these light element fuel particles to beam energies sufficient to cause significant numbers of fusion events. For the practical purposes of generating power, the accelerators should be capable of accelerating particles to the range of a few hundred thousand electron volts. In the preferred embodiment, each accelerator should be capable of accelerating deuterium particles to approximately 500 keV at very high beam current and beam current density. This reactor in its most efficient configuration may possibly release more energy than it consumes. The energy will be released primarily as heat. To put that energy to useful work, a method of heat exchange to generate power is incorporated into the reactor design. The reaction chamber is in heat exchange contact with a coolant. The coolant is contained within a pressure vessel that holds the coolant in heat exchange contact with the reaction chamber. The pressure vessel will also function as a radiation shield, of concrete, lead or other heavy material erected around the reaction chamber to block dangerous radiation. A coolant pump circulates coolant from inside the pressure vessel to a heat exchanger. At the heat exchanger, the heat from the reactor may be converted to steam which can be used to turn electric turbines, or to heat buildings.

Some fusion by-products may be radioactive; therefore, the vacuum pump must evacuate the fusion by-products into a containment vessel (not shown). If any radioactive waste is created by this reactor, it will be much less in volume than that created by fission reactors. Also, any possible waste from this reactor will neither be as toxic nor as long lived as that from fission reactors.

The tendency of fusion reactions to create by-products that contaminate and halt the reaction can be overcome by pulsing the beams and giving the vacuum pump time to clear the chamber of contaminant by-products.

Collision of stray particles with the wall of the reaction chamber may also create by-products that contaminate the reaction. This problem can be dealt with in part by lining the walls with appropriate materials so that the production of contaminants is minimized. Also, the straying or scattering of particles can be further reduced by utilizing appropriately dense beams and by precise aiming of the beams.

THEORY OF OPERATION

The primary novelty of this method of inducing fusion is its capacity to reduce the scattering of multiple colliding non-neutralized particle beams. It accomplishes minimizing of scattering through the novel combination of four factors: the funnel-trap matrix, the solid-matrix, force-balanced collisions, and appropriate beam energies. These four primary factors are described as follows:

1) Funnel-Trap Matrix. A funnel-trap matrix is formed by colliding at least four particle beams such that for every particle beam $\beta$ entering the collision reaction zone, the other particle beams intersect at the collision reaction zone in such a manner that a funnel-like Coulomb field matrix is formed in the path of the first particle beam, $\beta$. The Coulomb field formed by the other intersecting beams funnels the particles of particle beam $\beta$ to the center of the collision reaction zone. Thus, the particles' own Coulomb fields steer the particles toward the center of the collision reaction zone. The angle at which the beams collide forms a Coulomb field matrix that acts as a trap or funnel that guides the ionized particles to the center of the collision reaction zone. Such a matrix is most simply and efficiently embodied in a tetrahedral matrix in which four beams of particles all intersect each other at approximately 109.471220634491 degrees. Other embodiments of the funnel-trap matrix include: the regular octahedral matrix, in which six beams intersect each other (at 90 degrees) at the center of a regular octahedral space after each passing through a different one of the six vertices of the octahedral space; the cubic matrix in which eight beams intersect each other at the center of a cubic space after each passing through a different one of the eight vertices of the cubic space; the regular icosahedral matrix, in which twelve beams intersect each other at the center of a regular icosahedral space after each passing through a different one of the twelve vertices of the icosahedral space; and, the regular dodecahedral matrix, in which twenty beams intersect each other at the center of a regular dodecahedral space after each passing through a different one of the twenty vertices of the dodecahedral space. Many more funnel-trap matrices may be constructed by either, changing the angles of intersection, or using different numbers (greater than four) of intersecting beams. But changing the angles of intersection would make the matrices more "slippery" and less trap-like, therefore less efficient. Also, greater numbers of intersecting beams result in greater problems of precision and a less stable structure that is less likely to hold its form until the particles collide. In addition to being less stable, greater numbers of beams needlessly increase the cost and complexity of the system. In order to form any funnel-trap matrix with only colliding beams, there must be at least four beams.

2) Solid-Matrix Collisions. For the purposes of this disclosure a solid-matrix may be described simply as any collision matrix in which at least four particle beams collide in a manner such that for each half of space defined by any plane that contains the center of the collision reaction zone at least one of the incoming particle beams does not lie in the plane, and that beam approaches the collision reaction zone from that half of space, and at least one other of the remaining three particle beams also does not line in the plane, and it approaches the collision reaction zone from the other half of space defined by the plane. It is not meant that one single beam approachs from both halfs of space, but that for any plane passing through the center there are at least two beams such that one beam approaches the center of the zone from one half of space and the other beam approaches from the other half of space. To meet this requirement for any plane, a minimum of four beams is necessary. (By the term "half of space" it is meant a half of the three dimensional Universe that lies on one side of an imaginary infinite flat plane that passes through the center of the collision reaction zone). Such a matrix can be accomplished most economically by exactly four beams. With less than four beams it is impossible to construct a matrix satisfying the given conditions for a solid-matrix.

3) Balanced collisions. For maximum efficiency, it is important that the force vectors of the intersecting beams be balanced so that there is not a significant shift of the reaction's center of mass after initial impact. The force vectors of the intersecting beams are balanced when the total force vector of any incoming beam is substantially equal in magnitude and opposite in direction to the collective force vectors of all other particle beams impacting the reaction zone. Balanced force vectors can be easily determined by conventional vector addition of the force vectors of all intersecting beams. Adding the force vectors in a balanced collision will result in a vector with a force magnitude of zero. In the simplest scenario the particle beams are composed of the same kind of particle and have similar energies, currents and current densities. Colliding nearly identical particle beams is the easiest way to assure that the force vectors of particle beams impacting the collision reaction zone are balanced so that the center of mass of the reaction does not shift after the initial collision.

4) Appropriate Energy Collisions. Appropriate energy collisions are collisions that have enough force to cause fusion but not so much force as to cause elastic collisions. In the funnel-trap matrix, the kinetic energy of the incoming particles drives the particles deep into the funnel where they are squeezed by the pressure of the Coulomb fields on all sides. Thus, the matrix forces the particles together by their own kinetic energy, and it causes them to collide through the guidance of their own Coulomb forces. Therefore, the particles approach each other close enough, at a slow enough speed, for their Coulomb repulsion to be overcome by the strong nuclear force, thereby inducing fusion.

All the above conditions, the funnel-trap matrix, the solid-matrix, force-balanced collisions, and appropriate beam energies, are most elegantly and economically satisfied by the presently preferred embodiment of the subject reactor. In its presently preferred embodiment, four particle beams are collided from four directions all at angles of incidence of approximately 109.471220634491 degrees to each other. Using more than four beams unnecessarily complicates the calculations and multiplies the hardware required for a successful matrix. This angle of approximately 109.471220634491 degrees is an approximation of the angles made by four rays intersecting each other at the center of a regular tetrahedral space after each passing through a different one of the four vertices of the tetrahedral space. The remainder of this section is an explanation of how and why this form of collision matrix reduces scattering.

Let us first consider the case of four identical beams colliding. Assume that, from the reference frame of the observer, all four beams are accelerating the same type of particle at the same energies, at the same beam current and beam current density. The hypothesis is that four such beams will be least likely to scatter if their particles are colliding at nearly the same angles of incidence to each other. There is only one angle at which all four beams can intersect each other equally. That angle of incidence is approximately 109.471120634491 degrees. The exact angle at which the four beams of particles should intersect is given by the measure of the obtuse interior angle of an isosceles triangle that has two sides of length equal to the square root of three units, and a base of length equal to twice the square root of two units.

To continue to illustrate the reasoning behind this theory, let us review what is already known about colliding beam (impact) fusion.

We know that fusion occurs when the strong nuclear force of attraction (strong hadronic interaction) overcomes the Coulomb (electrostatic) repulsion. The strong force can only overcome electrostatic repulsion when nuclei are separated by about $10^{-15}$ meters or less.

We know that fusion events can be induced by colliding multiple beams of fast particles. The rate of fusion events between colliding particles increases with the kinetic energy of approach up to energy levels around several million electron volts. At these higher energies of approach, the rate of fusion events can decline because of the increase in elastic collisions due to the decreased amount of time in which the interacting particles are separated by no more than $10^{-15}$ meters.

We know that the radii of atomic nuclei are a little less than $10^{-14}$ meters. The radius of a typical atom is about $10^{-10}$ meters. Thus the radii of atomic nuclei are about one ten thousandth the radii of atoms, and their volumes are about $10^{-15}$ the volumes of the atoms. Thus, the atoms may be said to be mostly empty space. The range of the Coulomb repulsive field fills that nearly empty space (which is empty except for orbital electrons). Accelerated nuclei are stripped of their electrons but they retain their Coulomb fields. Therefore, usually, when we collide beams of high energy atomic nuclei with each other, most of the particles miss the first several thousand target particles they come across due to the relatively wide spacing between nuclei. But the particles do not miss each other's Coulomb fields. Interaction with the Coulomb fields diverts the particles and slows them down. The closer the particles approach each other, the stronger their Coulomb repulsion affects them.

Scattering of colliding particle beams occurs even in optimum ranges of around 100,000 to 1,000,000 electron volts. In these ranges, while the average individual particles have enough energy to fuse on impact, and the particles are not traveling so fast that they will have only elastic collisions and pass by each other, they still tend to scatter rather than to fuse. The reason for this can be readily seen in the simplified case of two particles on a collision course in isolation, unaffected by forces from other particles. Two such particles are likely to collide only if they are approaching each other from nearly perfectly opposite directions. As they approach each other, their Coulomb repulsion becomes stronger. Thus, slight deviations from a perfect collision course tend to be rapidly exaggerated. The rate at which deviations are exaggerated increases as the two particles approach each other. Thus, usually, the two particles will alter each other's course enough so they slip past each other without fusing. This simplified case can be extended by analogy to the case of two intersecting beams with their millions of particles. When two beams of particles are colliding head-on at fusion producing velocities, the vast majority of the particles, rather than fusing, tend to scatter each other due to Coulomb repulsion. All prior experiments with multiple beams intersecting head-on at 180 degrees have failed to achieve significant rates of fusion due to the scattering of the interacting particles. So the head-on collision method has not been a significant source of fusion energy.

Let us consider another simplified but slightly different scenario, which will help illustrate the rational of this theory. Imagine three particles on a collision course. Assume they are traveling in a straight line trajectory and all three trajectories lie in the same plane. For the sake of illustration, let us take a further momentary stretch of the imagination and imagine that these three particles are in a two-dimensional space so that they cannot leave the plane. Usually the Coulomb forces of these particles would cause them to scatter rather than collide. But if these three particles were on a collision course at angles of 120 degrees to each other, the case is different. At this angle of incidence the influence any one particle's Coulomb field has on the course of any second particle is counteracted by the influence of the Coulomb field of the third particle on the second particle's course. Thus the Coulomb fields balance each other, and do not divert the particles from their courses. Instead, the Coulomb forces keep the particles on their collision course. The Coulomb fields of any two particles colliding in this imaginary scenario form a sort of curved V shape that funnels the third particle into the center of the collision zone. In this two-dimensional scenario, if we confine the particles to the two-dimensional plane, then there is no place for the colliding particles to go but the center of the collision zone. All the particles are colliding in a balanced collision matrix at the same angle to each other creating a funneling effect. The Coulomb forces slow incoming particles and guide them into the center of the collision zone. If the colliding particles are at sufficient but not excessive energies, they will be brought to within $10^{-15}$ meters by the funneling effect. If these particles were confined to the two-dimensional plane so that they could not slip up or down into another dimension, they would have no choice but to fuse.

Of course, in reality, three such particles would not be confined to a two-dimensional plane. Instead, they would be free to slip up or down out of the plane and therefore probably not collide and fuse. But this exercise of the imagination in two dimensions sets the stage for us to consider the projection of this two-dimensional scenario into three-dimensional space. The angle 120 degrees is an important angle in two-dimensional space. It is the angle in two-dimensional space at which the greatest number of particles can collide with each other all at the same angle of incidence to one another.

Projecting this scenario into three dimensions, the analog of 120 degrees is approximately 109.471220634491 degrees. For brevity we may call this angle $\Omega$. In other words, the angle in three-dimensional space at which the greatest number of particles can collide with each other all at the same angle of incidence to one another is $\Omega$. In three-dimensional space, four particles on a collision course all at the angle $\Omega$ to each other is analogous to three particles colliding at 120 degrees in two-dimensional space. The resulting collision matrix in three-dimensional space tends, more than any other previous non-neutralized beam-beam design, to funnel particles into the center of the reaction rather than to scatter them. As the four particles approach the collision zone, they come under the influence of each other's Coulomb fields. At the $\Omega$ angle of incidence, the influence any one particle's Coulomb field has on the course of any second particle is counteracted by the influence of the Coulomb fields of the third and fourth particles on the second particle's course. Thus, the Coulomb fields balance each other and, rather than diverting the particles, keep them on their collision course. The Coulomb fields of any three particles forms a somewhat distorted cone shape that funnels the fourth particle into the center of the collision zone. In this three-dimensional scenario, unlike the two-dimensional scenario, there is no place else for the colliding particles to go. They cannot slip up or down into another dimension. They have no choice but to fuse. All the particles are colliding in a balanced collision matrix at the same angle to each other creating the funneling effect. The funneling effect slows incoming particles and guides them into the center of the collision zone. The Coulomb forces help us rather than hinder us in this process. As the Coulomb forces guide the colliding particles, they also slow them down, thereby increasing containment time and density of particles near the center of the reaction. If the colliding particles are at sufficient but not excessive energies, some of them will be brought to within $10^{-15}$ meters by the funneling effect for a long enough time for the strong nuclear force to overcome the Coulomb repulsion. Thus the particles, more than any other previous non-neutralized beam-beam reactor, will tend to fuse rather than to scatter.

This scenario of colliding four particles can be extended by analogy to the case of colliding four beams, containing many millions of particles each.

Conclusion, Ramifications, and Scope

Accordingly, from the above specification the reader will see the subject reactor is a novel invention not obviously implied in the previous art. It will be valuable as an improved scientific tool. More importantly, it, or some future improvement of its design may be the first reactor to generate abundant safe nuclear energy. Additionally, this reactor: is an improvement over previous non-neutralized beam-beam reactors; reduces scattering of colliding particles; does not cause collisions with orbital electrons; does not shift the center of mass of the reaction; does not have to meet self-ignition criteria; has no containment problem; has no problem with adding fuel; is a relatively simple and inexpensive reactor, produces little or no toxic waste; is not at risk of exploding or melting down; and has inexpensive fuel available in virtually unlimited quantities.

Although the description above contains many specifics, these should not be construed as limiting the scope of the invention, but rather illustrations of some embodiments of this invention. Many modifications within the reactor's basic principles are possible.

For example, one type of obvious modification would be to change the shape of the components. The reaction chamber for instance does not have to be round.

In another simple modification the angle of incidence of the four colliding beams may be changed somewhat from $\Omega$. How far the angles of incidence may be increased or decreased depends on which other factors are modified, but in no case with only four beams may the angles of incidence reach as high as 180 degrees.

Another example of a possible modification would be to eliminate noncritical parts such as the heat exchanger.

For another example, the particle beams need not be of the same energy and intensity. Though the accelerators of the preferred embodiment are linked and synchronized so that their particle beams are of the same energy and intensity, this is not necessary for the reactor to be effective. But in any case, for maximum efficiency, the beam energies or intensities should be adjusted so that there is no shift in the center of mass of the reaction after initial collision of particles. The center of mass should not shift, but a slight shift would not critically affect efficiency.

In another example of a possible modification, other forms of fusion fuel, such as tritium, hydrogen, helium, lithium, boron, beryllium, etc., may be substituted for deuterium in one or more of the beam. Substitution of other forms of fusion fuel results in more change or changes in the beam carrying the new form of fuel. The change or changes to the beam could be any of a number of things including its energy, or velocity, or current, or current density, or diameter. To maintain efficiency in the face of such changes to a beam or beams, the remaining beam or beams must be altered in some way. For instance, if the energy of one beam is increased, then to maintain efficiency, either its angle of incidence with the other beams must be increased or the energy of the other beams must be increased. Accelerators in various embodiments would be modified and arranged according to what kind of particles they are accelerating and at what energies they are accelerating them.

Another modification of the preferred embodiment is to use only one particle accelerator. Only one is necessary to achieve sufficient relative impact velocity for fusion. The accelerator's beam may be split in four and all four beams collided with each other. One, two, three, four or more accelerators may be used but more than four would be superfluous and unnecessarily complicate the reactor. The word "accelerator" for the purposes of this specification means any source, natural or artificial, of a high energy particle beam or beams including but not limited to: linacs, cyclotrons, synchrotrons, synchrocyclotrons, synchrophasotrons, phasotrons, betatrons, linear accelerators, microtrons, etc. The word "beam" for the purposes of this specification means any beam, jet, stream, pulse, or ray of particles.

There are an infinite variety of minor modifications to the preferred embodiment of this reactor that will still meet the requirements of the solid matrix, and the requirement of the force balanced collisions. Thus, it is not possible to describe every minor modification covered by the scope of this invention.

Accordingly, while there has been shown and described the presently preferred embodiment of this reactor and several modifications thereof, still more modifications thereto will readily occur to those skilled in the art. It is desired therefore that the invention not be limited to the specific steps and arrangements shown and described, but it is to be understood that all equivalents, alterations and modifications, coming within the spirit and scope of the present invention, are herein meant to be included.

I claim as new, and desire to have protected by Letters Patent, the following:

1. A method of inducing nuclear fusion comprising the steps of:
    accelerating four particle beams to energies sufficient to produce fusion upon collision, and
    colliding said four particle beams simultaneously, at fusion producing relative energies of approach, at a single collision reaction zone, in high vacuum, and
    colliding said four particle beams at predetermined energies, currents and current densities, such that the force vector of any particle beam impacting the collision reaction zone is substantially equal in magnitude and opposite in direction to the sum of the force vectors of all other particle beams impacting the collision reaction zone, and
    colliding said four particle beams so that for each half of space defined by any plane that contains the center of said collision reaction zone at least one of said particle beams does not lie in said plane and approaches the collision reaction zone from half of space, and at least one other of said four particle beams also does not lie in said plane, and approaches the collision reaction zone from the other half of space defined by said plane,
    whereby said four particle beams collide at angles such that the Coulomb repulsion of the impacting particle beams forms a trap or funnel-like Coulomb field matrix that tends to guide the particles to the center of said collision reaction zone, and whereby the kinetic energy of said particles tends to force said particles to fuse.

2. The method of claim 1 wherein said four particle beams all intersect each other at angles of incidence of approximately 109.471220634491 degrees, wherein the exact measure of the desired angle is given by the measure of the obtuse interior angle of an isosceles triangle that has two sides measuring the square root of three units and a base measuring twice the square root of two units.

3. The method of claim 2 wherein said particle beams are composed of light element nuclear fusion fuel materials selected from the group consisting of hydrogen, deuterium, tritium, helium, lithium, boron, beryllium, and their various isotopes, excluding pure proton-proton fuel which is well known to be highly inefficient, so that said fusion events are exothermic.

4. The method of claim 3 wherein said particle beams are beams of deuterium particles.

5. The method of claim 4 wherein said beams of deuterium particles have energies of approximately 500 keV.

6. The method of claim 3 further including conventional means of capturing energy from said fusion events, to convert said energy to useful forms of power such as electricity.

7. A nuclear fusion reactor comprising:
    at least one accelerator assembly including an ion source and focusing apparatus, capable of producing four particle beams at energies sufficient to produce fusion events upon collision, arranged so that said four particle beams are collided at a single collision reaction zone, and
    an evacuated reaction chamber wherein said particle beams are collided simultaneously at said collision reaction zone, and
    said at least one accelerator assembly arranged and set to predetermined beam energies and intensities such that all said four particle beams collide in a manner such that the force vector of any beam of fusible particles impacting the collision reaction zone is substantially equal in magnitude and opposite in direction to the sum of the force vectors of all other particle beams impacting the collision reaction zone,
    said at least one accelerator assembly arranged such that from each half of space defined by any plane that contains the center of the collision reaction zone, at least one of said four particle beams does not lie in the plane, and approaches the collision reaction zone from that half of space, and at least one other of said four particle beams also does not lie in said plane, and approaches the collision reaction zone from the other half of space defined by said plane,
    whereby said at least one accelerator assembly is configured to collide said four particle beams in a pattern such that the Coulomb repulsion of the particles of the impacting particle beams forms a trap or funnel-like Coulomb field matrix that guides the particles to the center of said collision reaction zone, and whereby the kinetic energy of said particles tends to force said particles to fuse.

8. The reactor of claim 7 wherein said four particle beams intersect each other at angles of incidence of approximately 109.471220634491 degrees, wherein the exact measure of the preferred angle is given by the measure of the obtuse interior angle of an isosceles triangle that has two sides measuring the square root of three units and a base measuring twice the square root of two units.

9. The reactor of claim 8 wherein said four particle beams are composed of light element nuclear fusion fuel materials selected from the group consisting of hydrogen, deuterium, tritium, helium, lithium, boron, beryllium, and their various isotopes, excluding pure proton-proton fuel which is well known to be highly inefficient, so that said fusion events are exothermic.

10. The reactor of claim 9 wherein said four particle beams are beams of deuterium particles.

11. The reactor of claim 9 further including conventional means of converting fusion energy to useful forms of power such as electricity.

12. The reactor of claim 11 further including a pressure vessel, and within said pressure vessel a coolant in heat exchange contact with said evacuated reaction chamber as a means of capturing heat for conversion to convenient forms of power.

13. The reactor of claim 7 wherein said predetermined beam energies are approximately 500 keV.

14. The reactor of claim 13 wherein said at least one accelerator assembly comprises exactly four accelerators.

15. The reactor of claim 7 wherein said four particle beams are composed of light element nuclear fusion fuel materials selected from the group consisting of hydrogen, deuterium, tritium, helium, lithium, boron, beryllium, and their various isotopes, excluding pure proton-proton fuel which is well known to be highly inefficient, so that said fusion events are exothermic.

16. The reactor of claim 15 wherein said four particle beams are beams of deuterium particles.

* * * * *